United States Patent
Maruyama

(10) Patent No.: US 10,158,282 B1
(45) Date of Patent: Dec. 18, 2018

(54) SWITCHING POWER SUPPLY DEVICE

(71) Applicant: FUJI ELECTRIC CO., LTD., Kawasaki-shi, Kanagawa (JP)

(72) Inventor: Hiroshi Maruyama, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/965,085

(22) Filed: Apr. 27, 2018

(30) Foreign Application Priority Data

Jun. 14, 2017 (JP) ................................ 2017-116471

(51) Int. Cl.
*H02M 1/36* (2007.01)
*H02M 1/32* (2007.01)
*H02M 3/335* (2006.01)
*H02M 1/00* (2006.01)

(52) U.S. Cl.
CPC ............... *H02M 1/36* (2013.01); *H02M 1/32* (2013.01); *H02M 3/33569* (2013.01); *H02M 2001/0009* (2013.01)

(58) Field of Classification Search
CPC .. H02M 1/36; H02M 3/3353; H02M 3/33569; H02M 1/32
See application file for complete search history.

(56) References Cited

U.S. PATENT DOCUMENTS

2015/0091460 A1* 4/2015 Kato ................. H02M 3/33553
  315/200 R
2017/0141678 A1* 5/2017 Liu ......................... H02M 1/36

FOREIGN PATENT DOCUMENTS

JP  2007-202285 A  8/2007
JP  2015-219946 A  12/2015

* cited by examiner

*Primary Examiner* — Kyle J Moody
(74) *Attorney, Agent, or Firm* — Rabin & Berdo, P.C.

(57) ABSTRACT

A switching power supply device includes a power factor correction (PFC) circuit, a DC-DC converter, and a control IC incorporating functions of controlling these components. At power up, a capacitor connected to a terminal VCC is charged with a current whose voltage has been adjusted by a starting circuit. When a voltage across the capacitor reaches a UVLO cancelation voltage, an under-voltage lockout (UVLO) circuit outputs a first enable signal, thereby driving a PFC control circuit. When the PFC control circuit outputs a PFC switching signal, a PFC switching detection circuit outputs a second enable signal, thereby driving an LLC control circuit. Since the time between the start of the PFC switching operation and the start of the operation of the LLC control circuit is shortest, there is no need to supplement the starting power and arrange an auxiliary winding for an inductor.

9 Claims, 9 Drawing Sheets

SWITCHING POWER SUPPLY DEVICE

CROSS-REFERENCE TO RELATED APPLICATION

This application is based upon and claims the benefit of priority of the prior Japanese Patent Application No. 2017-116471, filed on Jun. 14, 2017, the entire contents of which are incorporated herein by reference.

BACKGROUND OF THE INVENTION

1. Field of the Invention

Embodiments discussed herein relate to a two-stage switching power supply device including an upstream power factor correction (PFC) circuit and a downstream direct-current (DC)-DC converter cascaded to the PFC circuit. The switching power supply device generates a DC output voltage from an alternating-current (AC) power supply.

2. Background of the Related Art

This kind of two-stage switching power supply device including an upstream PFC circuit and a downstream DC-DC converter is used for a power supply device used for home appliances that include lighting power supply circuits or whose power consumption is 75 watts (W) or more. The PFC circuit improves the power factor by maintaining a harmonic current that occurs in the switching power supply device at a certain limit value or lower and generates a DC intermediate voltage, which has been boosted from an AC input voltage. The DC-DC converter outputs a DC voltage of a predetermined value from the intermediate voltage generated by the PFC circuit.

To start this two-stage switching power supply device, the upstream PFC circuit needs to be started first, and the downstream DC-DC converter needs to be started next. This is because, if the DC-DC converter starts before the intermediate voltage is sufficiently boosted, the DC-DC converter is not successfully started.

There has been proposed a switching power supply device including a PFC circuit that starts before a DC-DC converter without fail. See Japanese Laid-open Patent Publication No. 2015-219946, for example. This switching power supply device according to Japanese Laid-open Patent Publication No. 2015-219946, the PFC circuit includes a first control integrated circuit (IC) therefor, and the DC-DC converter includes a second control IC therefor.

The first control IC includes a first power supply node. When a voltage at the first power supply node exceeds a first threshold, the first control IC is started and drives the PFC circuit. The second control IC includes a high-voltage input terminal, a starting circuit that generates a starting current from a high-voltage input voltage, and a second power supply node that outputs the starting current. When a voltage across a capacitor charged with the starting current outputted from the second power supply node exceeds a second threshold higher than the first threshold, the second control IC is started and drives the DC-DC converter.

The second power supply node and first power supply node are connected to each other via a diode. The diode has an anode connected to the second power supply node and has a cathode connected to the first power supply node. Thus, since the voltage at the first power supply node exceeds the first threshold before the voltage at the second power supply node exceeds the second threshold higher than the first threshold, the first control IC is started before the second control IC is started.

As described above, when the first control IC is started, the first control IC drives the PFC circuit. In this operation, the charging voltage of a capacitor connected to the first power supply node is used for the control power supply of the first control IC. However, since the charging voltage alone is not sufficient as the control power supply of the first control IC, the PFC circuit includes an auxiliary winding, which is inductively coupled to an inductor included in the PFC circuit. More specifically, by using power generated across the auxiliary winding when the PFC circuit performs a switching operation, the switching power supply device complements the insufficient power.

Next, when the voltage at the second power supply node exceeds the second threshold, the second control IC is started and drives the DC-DC converter. When the DC-DC converter starts a switching operation, power is generated across an auxiliary winding arranged at a transformer included in the DC-DC converter. The power generated across the auxiliary winding of the transformer is also supplied to the second power supply node and is used for the control power supply of the first and second control ICs. At this point, in the second control IC, the starting circuit is controlled to be cut off. As a result, since the starting current is no longer generated from the high-voltage input voltage, the power consumption by the high-voltage input voltage is reduced.

With the above switching power supply device, by setting the first threshold for starting the first control IC to be lower than the second threshold for starting the second control IC, the PFC circuit is started before the DC-DC converter is started. In addition, the starting current generated by the starting circuit and the power generated across the auxiliary winding coupled to the inductor are used as the control power supply when the PFC circuit is started. In addition, the power generated across the auxiliary winding coupled to the inductor and the power generated across the auxiliary winding of the transformer are used as the control power supply when the DC-DC converter is started.

However, with this switching power supply device according to Japanese Laid-open Patent Publication No. 2015-219946, when the first control IC is started, the insufficiency of the control power supply is supplemented with the power generated across the auxiliary winding coupled to the inductor. Thus, since the auxiliary winding and a rectifying and smoothing circuit are needed, the cost of the switching power supply device is increased accordingly. In addition, since space for arranging the auxiliary winding and the rectifying and smoothing circuit is needed, it is difficult to reduce the size or the weight of the switching power supply device.

In addition, the power supplied from the auxiliary winding coupled to the inductor is added to the power supplied from the auxiliary winding of the transformer, and the sum of the power is used as the control power supply for the first and second control ICs. Thus, if the second control IC is provided with an overvoltage protection function of determining whether the secondary side output voltage of the transformer is in an overvoltage state, the charging voltage across the capacitor connected to the second power supply node is not usable for the overvoltage detection. Namely, since the voltage generated across the auxiliary winding of the transformer is proportional to the voltage generated across the secondary winding of the transformer, if this voltage were directly applied to the second power supply node, this voltage could be used to predict the secondary-side output voltage of the transformer on the primary side of the transformer. However, since the voltage generated across the auxiliary winding coupled to the inductor is added to the voltage supplied from the auxiliary winding of the transformer, the secondary-side output voltage of the transformer is not predictable on the primary side of the transformer. Thus, an overvoltage detection circuit needs to be arranged on the secondary side of the transformer. In addition, a feedback circuit for feeding back a detection signal from the overvoltage detection circuit via a photocoupler to the primary side needs to be arranged. Consequently, the cost is increased by the configuration of the overvoltage detection circuit and the feedback circuit.

SUMMARY OF THE INVENTION

According to one aspect of the embodiment, there is provided a switching power supply device including: a power factor correction circuit configured to generate a direct-current (DC) intermediate voltage from an alternating-current (AC) power supply; a DC-DC converter configured to generate a DC voltage of a predetermined value from the intermediate voltage; and a control integrated circuit (IC) configured to incorporate functions of controlling the power factor correction circuit and the DC-DC converter, wherein the control IC includes: a starting circuit that outputs a current whose voltage has been adjusted from a pulsating current obtained by rectifying the AC power supply and charges a capacitor used for a power supply of the control IC; an under-voltage lockout circuit that monitors a voltage across the capacitor and outputs a first enable signal for instructing the power factor correction circuit to start an operation when the voltage across the capacitor reaches an under-voltage lockout cancelation voltage; a first control circuit that starts switching control of the power factor correction circuit upon receiving the first enable signal; a switching operation detection circuit that outputs a second enable signal for instructing the DC-DC converter to start an operation upon detecting the switching operation of the power factor correction circuit; and a second control circuit that starts to control switching of the DC-DC converter upon receiving the second enable signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
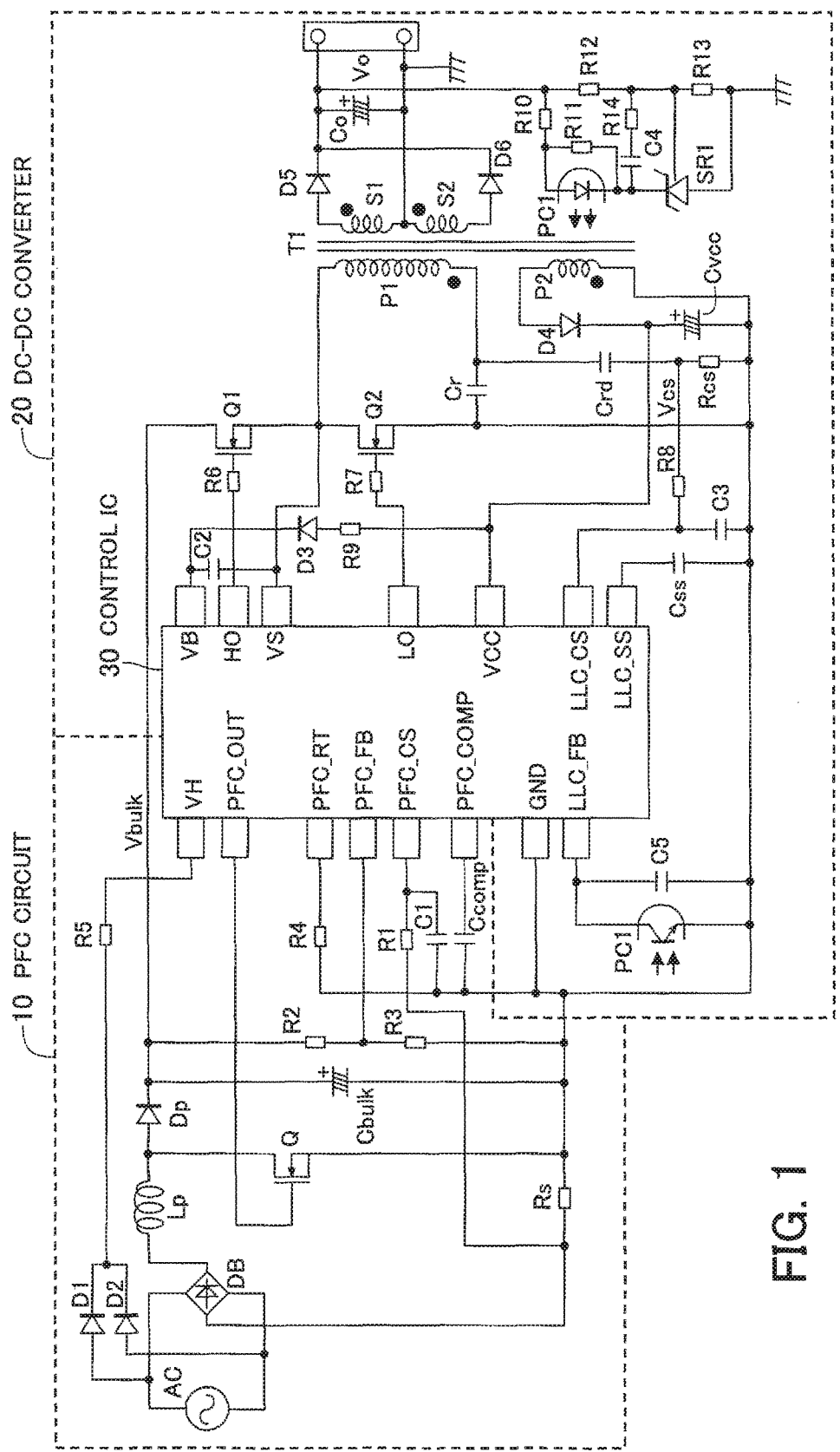
FIG. 1 is a circuit diagram illustrating a configuration example of a switching power supply device according to the present embodiment.

An embodiment will be described in detail with reference to the drawings by using, as an example, a switching power supply device including a power factor correction (PFC) circuit that operates in a critical current mode in which the PFC circuit sets a switching element to be on after a current that flows through an inductor reaches zero and an LLC current resonance DC-DC converter. In the following description, the name of an individual terminal and a voltage, signal, etc. at that terminal will be denoted by the same reference character, as needed.

Figure 2:
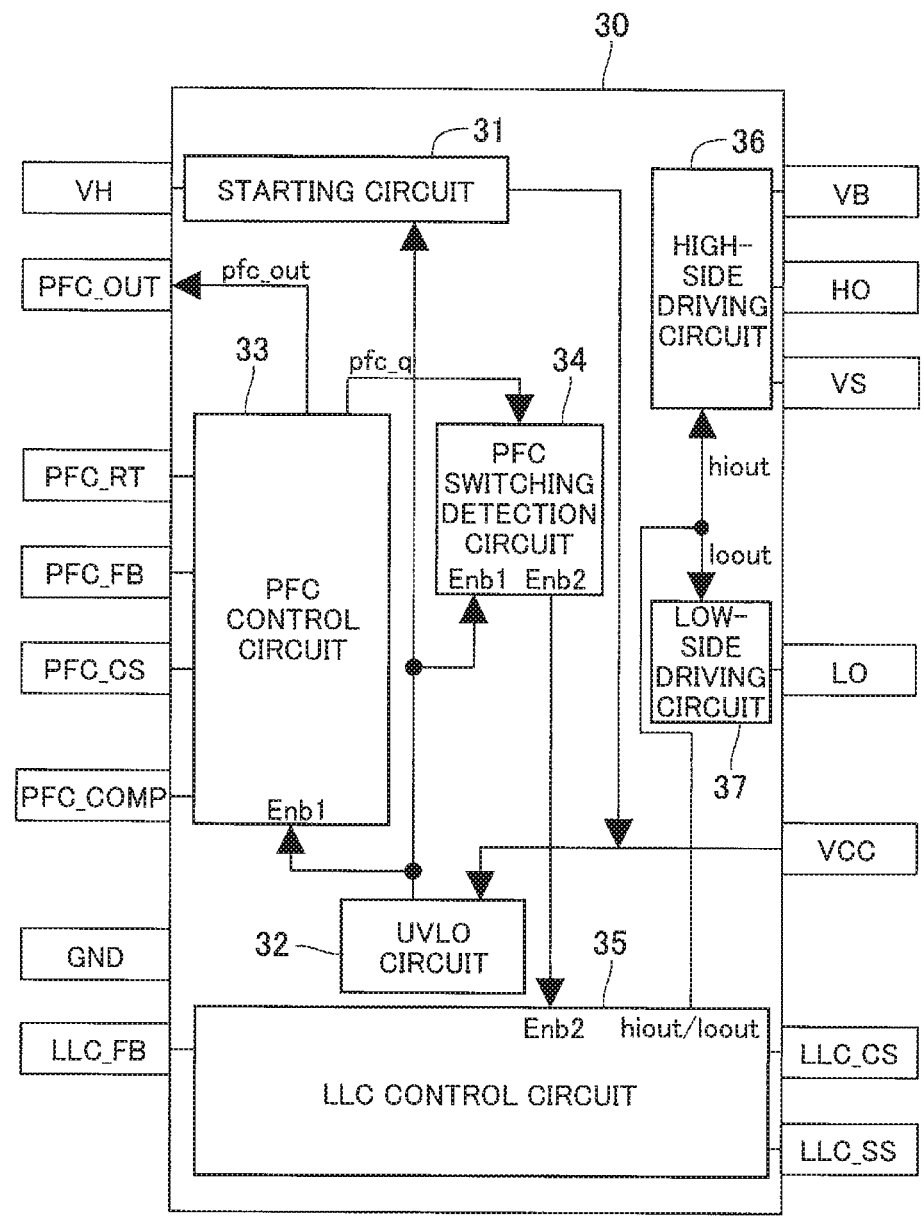
FIG. 2 is a functional block diagram illustrating a configuration example of a control IC.
Figure 3:
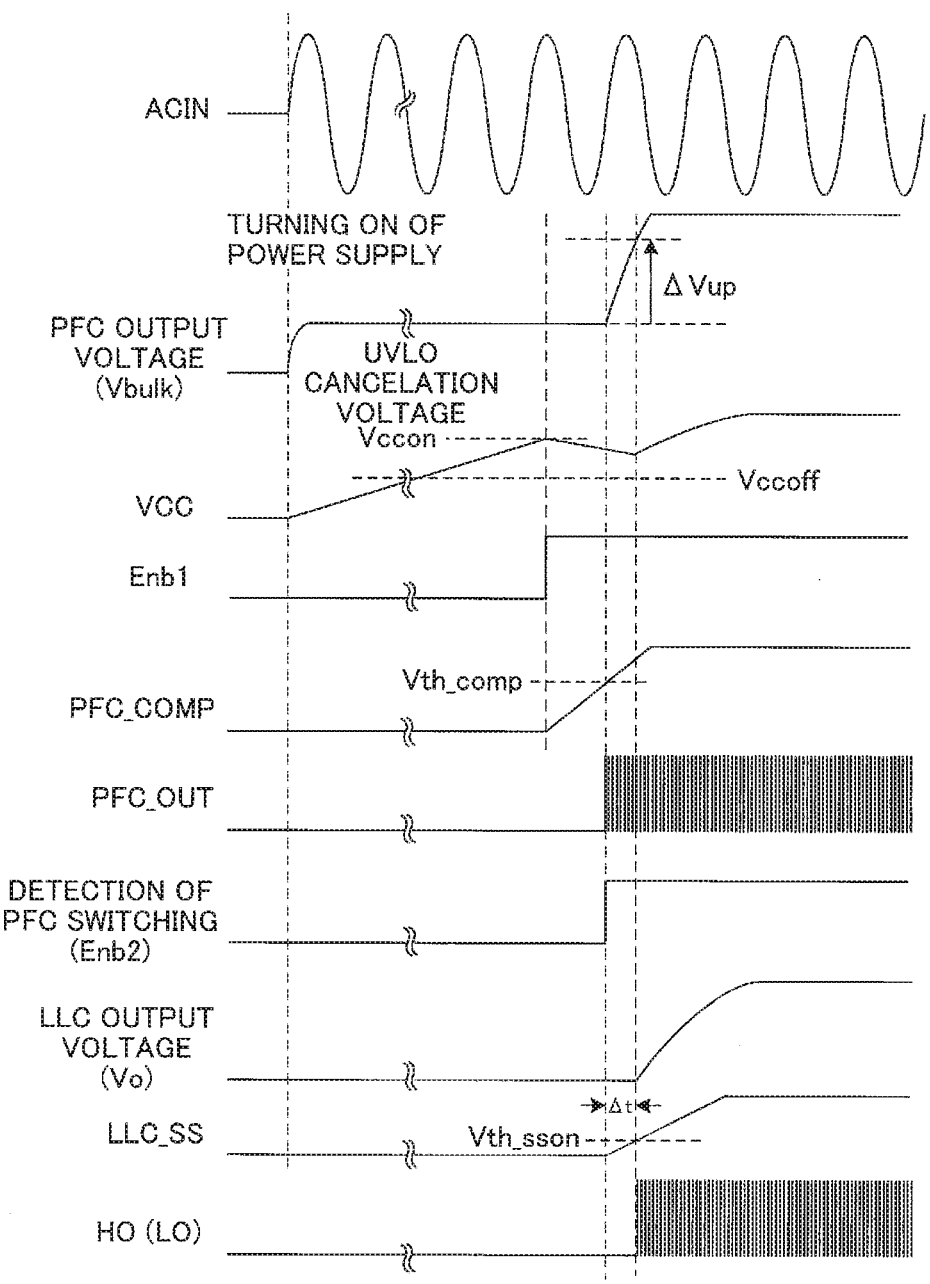
FIG. 3 illustrates operation waveforms of the switching power supply device according to the present embodiment.

FIG. 1 is a circuit diagram illustrating a configuration example of a switching power supply device according to one embodiment. FIG. 2 is a functional block diagram illustrating a configuration example of a control IC. FIG. 3 illustrates operation waveforms of the switching power supply device according to one embodiment.

As illustrated in FIG. 1, the switching power supply device according to the present embodiment includes a PFC circuit 10, a DC-DC converter 20, a control IC 30 incorporating functions of controlling the PFC circuit 10 and the DC-DC converter 20.

The control IC 30 includes a terminal PFC_OUT, a terminal PFC_RT, a terminal PFC_FB, a terminal PFC_CS, and a terminal PFC_COMP used for the PFC circuit 10. The control IC 30 also includes a terminal VB, a terminal HO, a terminal VS, a terminal LO, a terminal LLC_FB, a terminal LLC_CS, and a terminal LLC_SS used for the DC-DC converter 20. In addition, the control IC 30 includes a terminal VH, a terminal VCC, and a terminal GND relating to a power supply.

In the PFC circuit 10, both terminals of an AC power supply AC are connected to a diode bridge DB, and the diode bridge DB has a positive-electrode output terminal connected to one terminal of an inductor Lp. The other terminal of the inductor Lp is connected to the anode terminal of the diode Dp, and the cathode terminal of the diode Dp is connected to the positive-electrode terminal of the smoothing capacitor Cbulk. The negative-electrode output terminal of the diode bridge DB is connected to one terminal of the current detection resistor Rs, and the other terminal of the current detection resistor Rs is connected to the negative-electrode terminal of the smoothing capacitor Cbulk and the terminal GND of the control IC 30. A connection point of the inductor Lp and the diode Dp is connected to the terminal GND of the control IC 30 via a switching element Q. In the example in FIG. 1, a negative (N) channel metal-oxidesemiconductor field-effect transistor (MOSFET) is used as the switching element Q. This switching element Q has a drain terminal connected to the connection point of the inductor Lp and the diode Dp. In addition, the switching element Q has a gate terminal connected to the terminal PFC_OUT of the control IC 30 and has a source terminal connected to the terminal GND of the control IC 30. The diode bridge DB, the inductor Lp, the diode Dp, the smoothing capacitor Cbulk, and the switching element Q form a circuit that improves the power factor by bringing an average current waveform outputted from the diode Dp close to a sine wave of the AC input voltage and that outputs a boosted DC intermediate voltage Vbulk.

A connection point of the diode bridge DB and the current detection resistor Rs is connected to one terminal of a resistor R1, and the other terminal of the resistor R1 is connected to the terminal PFC_CS of the control IC 30 and one terminal of a capacitor C1. The other terminal of the capacitor C1 is connected to the terminal GND of the control IC 30. One terminal of a resistor R2 is connected to the positive-electrode terminal of the smoothing capacitor Cbulk, and the other terminal of the resistor R2 is connected to one terminal of a resistor R3. The other terminal of the resistor R3 is connected to the negative-electrode terminal of the smoothing capacitor Cbulk. A connection point of the resistors R2 and R3 is connected to the terminal PFC_FB of the control IC 30. In addition, the terminal PFC_RT of the control IC 30 is connected to one terminal of a resistor R4, and the terminal PFC_COMP of the control IC 30 is connected to one terminal of a phase compensation capacitor Ccomp. The other terminal of the resistor R4 and the other terminal of the capacitor Ccomp are connected to the terminal GND of the control IC 30.

In addition, both terminals of the AC power supply AC are connected to the anode terminals of diodes D1 and D2, the cathode terminals of the diodes D1 and D2 are connected to one terminal of a current limiting resistor R5. The other terminal of the resistor R5 is connected to the terminal VH of the control IC 30.

The DC-DC converter 20 includes a half-bridge circuit formed by connecting a high-side switching element Q1 and a low-side switching element Q2 in series with each other. In the example in FIG. 1, N channel MOSFETs are used as the switching elements Q1 and Q2. The switching element Q1 has a drain terminal connected to the positive-electrode terminal of the smoothing capacitor Cbulk in the PFC circuit 10. The switching element Q2 has a source terminal connected to the negative-electrode terminal of the smoothing capacitor Cbulk in the PFC circuit 10.

The gate terminal of the high-side switching element Q1 is connected to one terminal of a resistor R6, and the other terminal of the resistor R6 is connected to the terminal HO of the control IC 30. The gate terminal of the low-side switching element Q2 is connected to one terminal of a resistor R7, and the other terminal of the resistor R7 is connected to the terminal LO of the control IC 30. A connection point of the switching elements Q1 and Q2 is connected to the terminal VS of the control IC 30 and one terminal of a capacitor C2, and the other terminal of the capacitor C2 is connected to the terminal VB of the control IC 30.

The connection point of the switching elements Q1 and Q2 is also connected to one terminal of a primary winding P1 of a transformer T1, and the other terminal of the primary winding P1 is connected to one terminal of a resonance capacitor Cr. The other terminal of the resonance capacitor Cr is connected to the terminal GND of the control IC 30.

The leakage inductance between the primary winding P1 and secondary windings S1 and S2 of the transformer T1 and the resonance capacitor Cr form a resonance circuit. The resonance circuit may be formed without using the leakage inductance. Specifically, another inductor other than the inductance of the transformer T1 may be connected in series with the resonance capacitor Cr. In this way, the inductor is used for the resonance reactance of the resonance circuit. The one terminal of the resonance capacitor Cr is connected to one terminal of a shunt capacitor Crd, and the other terminal of the shunt capacitor Crd is connected to one terminal of a resistor Rcs. The other terminal of the resistor Rcs is connected to the terminal GND of the control IC 30. A connection point of the shunt capacitor Crd and the resistor Rcs is connected to one terminal of a resistor R8, and the other terminal of the resistor R8 is connected to the terminal LLC_CS of the control IC 30 and one terminal of a capacitor C3. The other terminal of the capacitor C3 is connected to the terminal GND of the control IC 30.

The terminal VCC of the control IC 30 is connected to one terminal of a resistor R9, and the other terminal of the resistor R9 is connected to the anode terminal of a diode D3. The cathode terminal of the diode D3 is connected to the terminal VB of the control IC 30.

The transformer T1 has an auxiliary winding P2 on its primary side. One terminal of the auxiliary winding P2 is connected to the anode terminal of a diode D4, and the cathode terminal of the diode D4 is connected to the positive-electrode terminal of a capacitor Cvcc. The negative-electrode terminal of the capacitor Cvcc is connected to the other terminal of the auxiliary winding P2 and the terminal GND of the control IC 30. A connection point of the diode D4 and the capacitor Cvcc is connected to the terminal VCC of the control IC 30. In addition, the LLC_SS terminal of the control IC 30 is connected to one terminal of a soft start capacitor Css, and the other terminal of the soft start capacitor Css is connected to the terminal GND of the control IC 30.

One terminal of the secondary winding S1 of the transformer T1 is connected to the anode terminal of a diode D5, and one terminal of the secondary winding S2 is connected to the anode terminal of a diode D6. Each of the cathode terminals of the diodes D5 and D6 is connected to the positive-electrode terminal of an output capacitor Co. The negative-electrode terminal of the output capacitor Co is connected to a connection point of the secondary windings S1 and S2 and is grounded. The secondary windings S1 and S2, the diodes D5 and D6, and the output capacitor Co form a circuit that converts an AC voltage generated across the secondary windings S1 and S2 into a DC output voltage Vo by rectifying and smoothing the AC voltage and form an output circuit of the switching power supply device.

The positive-electrode terminal of the output capacitor Co is connected to the anode terminal of a light-emitting diode (LED) of a photocoupler PC1 via a resistor R10. The cathode terminal of the LED is connected to the cathode terminal of a shunt regulator SR1. A resistor R11 is connected between the anode terminal and the cathode terminal of the LED. The anode terminal of the shunt regulator SR1 is grounded. The shunt regulator SR1 has a reference terminal connected to a connection point of resistors R12 and R13 connected in series with each other between the positive- and negative-electrode terminals of the output capacitor Co. A resistor R14 and a capacitor C4 that are connected in series with each other are connected between the reference terminal and the cathode terminal of the shunt regulator SR1. This shunt regulator SR1 is disposed to allow a current based on the difference between a voltage obtained by dividing the output voltage Vo (the voltage across the output capacitor Co) and an internal reference voltage to flow through the LED of the photocoupler PC1. The photocoupler PC1 includes a phototransistor having a collector terminal connected to the terminal LLC_FB of the control IC 30 and having an emitter terminal connected to the terminal GND of the control IC 30. A capacitor C5 is connected between the collector terminal and the emitter terminal.

As illustrated in FIG. 2, the control IC 30 includes a starting circuit 31 having an input terminal connected to the terminal VH and having an output terminal connected to the terminal VCC. The terminal VCC is connected to an Under-Voltage LockOut (UVLO) circuit 32, which is connected to the starting circuit 31.

The control IC 30 also includes a PFC control circuit (a first control circuit) 33 and a PFC switching detection circuit (a switching operation detection circuit) 34 for controlling the PFC circuit 10. In addition, the control IC 30 includes an LLC control circuit (a second control circuit) 35, a high-side driving circuit 36, and a low-side driving circuit 37 for controlling the DC-DC converter 20. The PFC control circuit 33 is connected to the UVLO circuit 32, the terminal PFC_OUT, the terminal PFC_RT, the terminal PFC_FB, the terminal PFC_CS, the terminal PFC_COMP, and the PFC switching detection circuit 34. The PFC switching detection circuit 34 is connected to the UVLO circuit 32 and LLC control circuit 35. The LLC control circuit 35 is connected to the terminal LLC_FB, the terminal LLC_CS, the terminal LLC_SS, the high-side driving circuit 36, and the low-side driving circuit 37. The high-side driving circuit 36 is connected to the terminal VB, the terminal HO, the terminal VS. The low-side driving circuit 37 is connected to the terminal LO.

Next, an operation of the switching power supply device having the above configuration will be described with reference to the operation waveforms in FIG. 3.

First, when the power supply is turned on and an AC voltage ACIN is inputted from the AC power supply AC, the AC voltage ACIN is subjected to full-wave rectification by the diodes D1 and D2. After the full-wave rectification, the obtained pulsating current is inputted to the terminal VH of the control IC 30 via the resistor R5. The high-voltage starting circuit 31 is connected to the terminal VH, and a current whose voltage has been adjusted by the starting circuit 31 is outputted from the terminal VCC. The capacitor Cvcc is connected to the terminal VCC, and this capacitor Cvcc is charged with the current outputted from the terminal VCC. The terminal VCC is a power supply node of the control IC 30, and a voltage across the capacitor Cvcc applied to the terminal VCC is a power supply voltage of the control IC 30.

At this point, the PFC circuit 10 is not started yet. However, since the AC voltage ACIN is subjected to full-wave rectification by the diode bridge DB and is next smoothed by the inductor Lp and the smoothing capacitor Cbulk, the PFC circuit 10 outputs the intermediate voltage Vbulk, which is a voltage obtained after the AC voltage ACIN is rectified and smoothed.

The terminal VCC of the control IC 30 is connected to the UVLO circuit 32 that detects the voltage at the terminal VCC. This UVLO circuit 32 includes a hysteresis comparator that compares the voltage at the terminal VCC with two thresholds Vccon and Vccoff (Vccon>Vccoff). When started, the UVLO circuit 32 outputs a UVLO signal that locks out an operation of the PFC control circuit 33, to prevent the PFC circuit 10 from erroneously operating due to a low voltage at the terminal VCC. When the voltage at the terminal VCC exceeds the threshold Vccon, which is a UVLO cancelation voltage, the UVLO circuit 32 outputs a signal Enb1 (a first enable signal) for instructing the start of an operation of the PFC control circuit 33. When the PFC control circuit 33 receives the signal Enb1, a UVLO function is canceled, and the PFC control circuit 33 is switched from a standby state to an operating state. When the voltage at the terminal VCC falls below the threshold Vccoff, the UVLO circuit 32 outputs the UVLO signal, again.

When the PFC control circuit 33 receives the signal Enb1 and starts an operation, since the error amplifier ErrAMP described below operates, the PFC control circuit 33 outputs a source current from the terminal PFC_COMP. Consequently, the phase compensation capacitor Ccomp connected to the terminal PFC_COMP is charged, and the voltage at the terminal PFC_COMP starts to rise. When the voltage at the terminal PFC_COMP exceeds a threshold Vth_comp (a first threshold voltage), which is a preset switching start voltage, the PFC control circuit 33 starts to output a drive signal pfc_out for switching the switching element Q from the terminal PFC_OUT. When the switching element Q starts a switching operation, the PFC circuit 10 is started, and a boost operation is started. As a result, the PFC circuit 10 starts to output a boosted intermediate voltage Vbulk.

This intermediate voltage Vbulk is divided by the voltage-dividing circuit formed by the resistors R2 and R3, and the voltage obtained by the division is supplied to the terminal PFC_FB. The PFC circuit 10 performs control processing so that the intermediate voltage Vbulk is maintained at a certain level. In addition, the current detection resistor Rs detects a current flowing through the PFC circuit 10 and converts the current into a voltage. The voltage obtained by the conversion is supplied to the terminal PFC_CS via the noise filter formed by the resistor R1 and the capacitor C1. The PFC control circuit 33 monitors this voltage obtained by the conversion. When the current flowing through the PFC circuit 10 exceeds a predetermined threshold, an internal overcurrent protection circuit operates, and the switching operation of the PFC circuit 10 is stopped.

At the same timing that the PFC control circuit 33 receives the signal Enb1, the signal Enb1 is supplied to the starting circuit 31. In this way, the operation of the starting circuit 31 is stopped, and the power consumption of the starting circuit 31 is reduced.

While outputting the drive signal pfc_out, the PFC control circuit 33 supplies a PFC switching signal pfc_q to the PFC switching detection circuit 34. When the PFC switching detection circuit 34 receives the PFC switching signal pfc_q and detects that the PFC control circuit 33 has started a switching operation, the PFC switching detection circuit 34 outputs a signal Enb2 (a second enable signal) for instructing the start of an operation to the LLC control circuit 35. Since the PFC switching detection circuit 34 instructs the LLC control circuit 35 to start an operation immediately after the PFC control circuit 33 starts a switching operation, the PFC switching detection circuit 34 is able to instruct the LLC control circuit 35 to start an operation within the shortest time.

When receiving the signal Enb2, the LLC control circuit 35 is switched to an active state. When the LLC control circuit 35 is switched to an active state, a constant current is supplied to the soft start terminal (the LLC_SS terminal), and the soft start capacitor Css connected to the terminal LLC_SS starts to be charged. When the voltage across the soft start capacitor Css exceeds a voltage Vth_sson (a second threshold voltage) at which a switching operation is started, the LLC control circuit 35 outputs a high-side drive signal hiout and a low-side drive signal loout. At this point, the intermediate voltage Vbulk outputted by the PFC circuit 10 is higher than the voltage obtained by rectifying and smoothing the AC voltage ACIN by a voltage ΔVup. The high-side drive signal hiout is supplied to the high-side driving circuit 36, and the low-side drive signal loout is supplied to the low-side driving circuit 37. In the high-side driving circuit 36, the level of the inputted high-side drive signal hiout is shifted by a level shift circuit, and the drive capability of the driving signal hiout is improved by a driving circuit. Consequently, the driving signal is supplied to the terminal HO. In the low-side driving circuit 37, the drive capability of the inputted low-side drive signal loout is improved by the driving circuit, and the driving circuit is supplied to the terminal LO. As a result, the DC-DC converter 20 starts a switching operation, and the output voltage Vo outputted from the secondary side of the transformer T1 is gradually increased. When the output voltage Vo on the secondary side of the transformer T1 starts to increase, the voltage at the auxiliary winding P2 across the transformer T1 also increases. As a result, a current is supplied to the terminal VCC of the control IC 30.

Since this output voltage Vo is detected by the shunt regulator SR1 and is fed back to the terminal LLC_FB via the photocoupler PC1, the output voltage Vo is maintained at a predetermined certain level. While this DC-DC converter 20 is performing a switching operation, a current flowing through the resonance capacitor Cr is divided by the shunt capacitor Crd and the resistor Rcs, and the current obtained by the division is converted into a voltage Vcs by the resistor Rcs. This voltage Vcs is supplied to the terminal LLC_CS via the noise filter formed by the resistor R8 and capacitor C3. In the LLC control circuit 35, the voltage Vcs is monitored. When the voltage Vcs exceeds a predetermined threshold, an internal overcurrent protection circuit operates, and the switching operation of the DC-DC converter 20 is stopped.

As described above, in this switching power supply device, since no auxiliary winding is coupled to the inductor Lp, the cost of the switching power supply device is reduced. In addition, since no current is supplied from such an auxiliary winding coupled to the inductor Lp and is used as a power supply of the control IC 30, a voltage proportional to the voltage generated across the secondary winding of the transformer T1 is obtained across the auxiliary winding P2 of the transformer T1. This enables the LLC control circuit 35 to incorporate an overvoltage protection function. In addition, in this switching power supply device, when the power supply is turned on, the PFC control circuit 33 is first activated, and the LLC control circuit 35 is next activated time Δt after the PFC control circuit 33 has started a switching operation. Namely, after the intermediate voltage Vbulk is sufficiently boosted in the boost operation by the PFC circuit 10, the downstream DC-DC converter 20 operates. In this way, the downstream current supply capability is improved, and as a result, stable starting characteristics are obtained.

In the period for which the switching operation of the LLC control circuit 35 is delayed, since the current supply to the terminal VCC is stopped, the voltage at the terminal VCC drops. If the voltage at the terminal VCC excessively drops down to the threshold Vccoff, the protection circuit of the UVLO circuit 32 operates, again. Thus, the capacitance of the capacitor Cvcc connected to the terminal VCC is set to a value so that the charges stored thereby maintain the voltage at the terminal VCC at the threshold Vccoff or more.

Next, specific configuration examples of the PFC control circuit 33, the PFC switching detection circuit 34, and the LLC control circuit 35 of the control IC 30 will be described.

Figure 4:
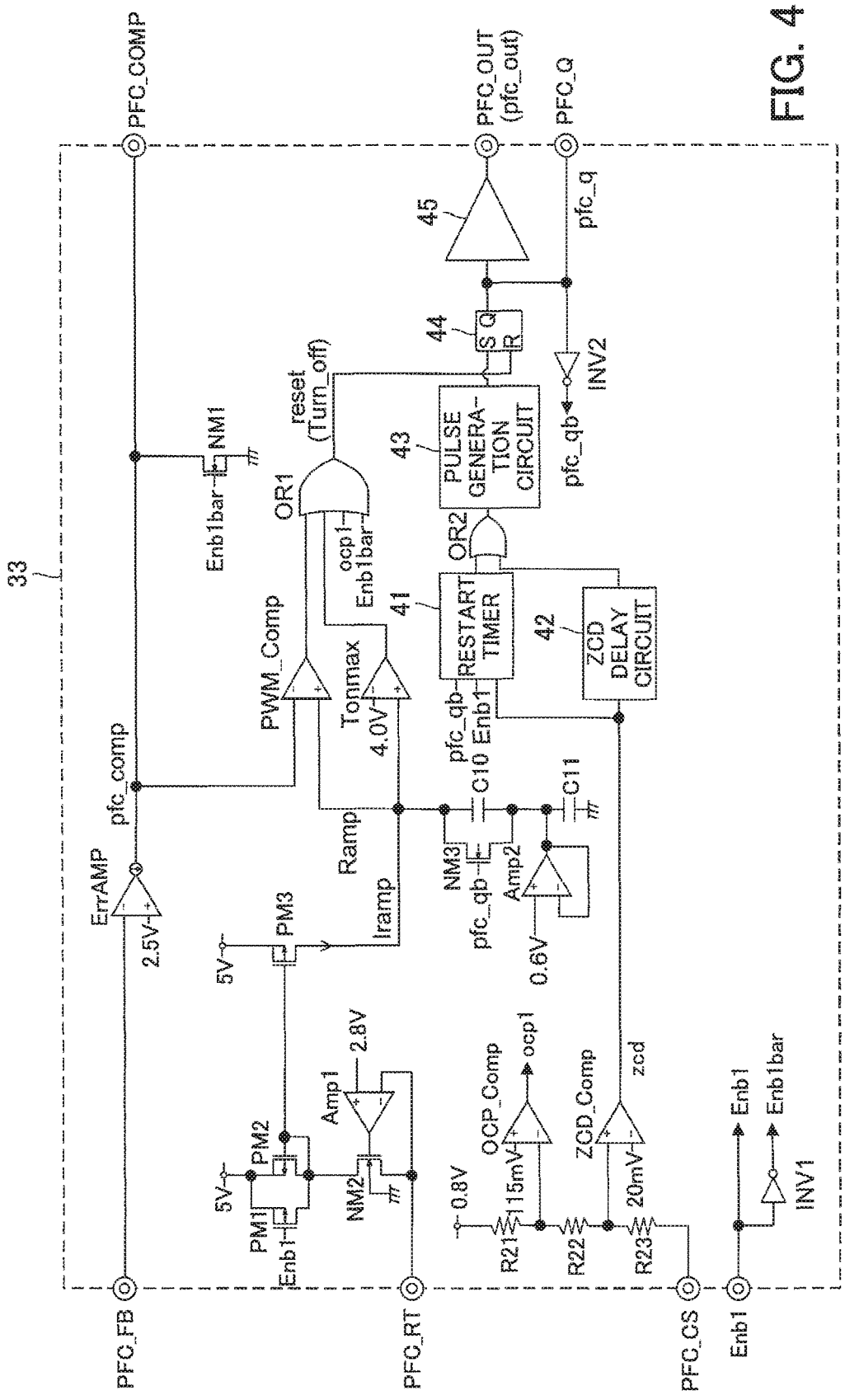
FIG. 4 is a circuit diagram illustrating a specific configuration example of a PFC control circuit.
Figure 5:
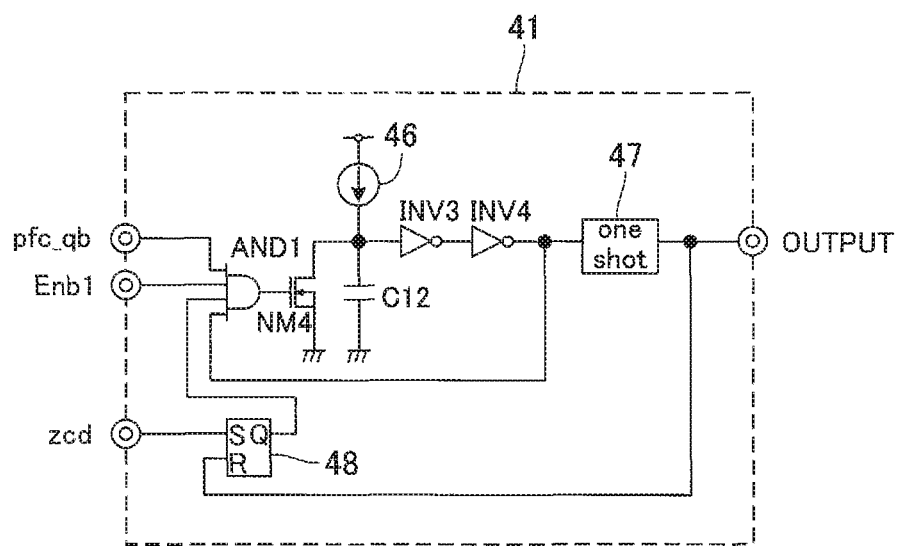
FIG. 5 is a circuit diagram illustrating a specific configuration example of a restart timer in the PFC control circuit.
Figure 6A:
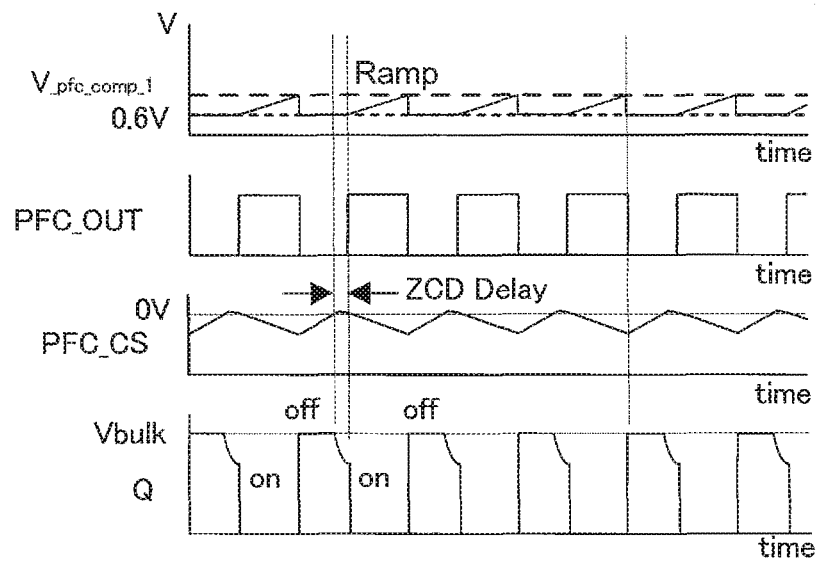
FIGS. 6A and 6B illustrate oscillation waveforms of the PFC control circuit, FIG. 6A illustrating oscillation waveforms when a voltage at a terminal PFC_COMP, which is an output voltage from an error amplifier ErrAMP, is low and FIG. 6B illustrating waveforms when the voltage at the terminal PFC_COMP is high.
Figure 6B:
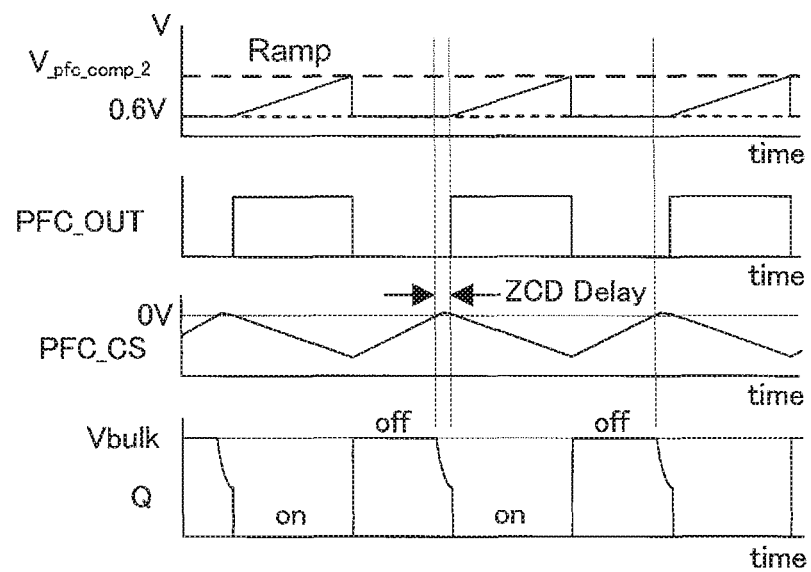

FIG. 4 is a circuit diagram illustrating a specific configuration example of the PFC control circuit 33. FIG. 5 is a circuit diagram illustrating a specific configuration example of a restart timer in the PFC control circuit 33. FIGS. 6A and 6B illustrate oscillation waveforms of the PFC control circuit 33, FIG. 6A illustrating oscillation waveforms when the voltage at the terminal PFC_COMP, which is the output voltage from the error amplifier ErrAMP, is low and FIG. 6B illustrating waveforms when the voltage at the terminal PFC_COMP is high.

The PFC control circuit 33 has an Enb1 terminal that receives the signal Enb1 for instructing the start of an operation from the UVLO circuit 32. This Enb1 terminal is connected to the input terminal of an inverter INV1, and a signal Enb1bar obtained by inverting the signal Enb1 is outputted from the output terminal of the inverter INV1.

The terminal PFC_FB is connected to the inverting input terminal (−) of the error amplifier ErrAMP. This error amplifier ErrAMP has a configuration of an operational transconductance amplifier (OTA) that converts a difference voltage between an input voltage to the non-inverting input terminal (+) and an input voltage to the inverting input terminal (−) into a current. A reference voltage of 2.5 volts (V) is applied to the non-inverting input terminal (+) of the error amplifier ErrAMP, and the output terminal of the error amplifier ErrAMP is connected to the terminal PFC_COMP. The error amplifier ErrAMP outputs a current signal pfc_comp whose source current is changed more significantly as the voltage at the terminal PFC_FB drops lower and lower than 2.5 V and whose sink current is changed more significantly as the voltage at the terminal PFC_FB rises higher and higher than 2.5 V. The PFC control circuit 33 performs pulse width modulation (PWM) control processing so that the voltage at the terminal PFC_FB is maintained at 2.5 V. Thus, the voltage division ratio of the intermediate-voltage-detection voltage-dividing circuit, which is formed by the resistors R2 and R3 and connected to the terminal PFC_FB, is set so that the voltage at the terminal PFC_FB is 2.5 V when the intermediate voltage Vbulk is boosted to a target voltage (for example, 400 V).

The output terminal of the error amplifier ErrAMP is connected to the drain terminal of an N channel metal-oxide-semiconductor (MOS) transistor NM1. The signal Enb1bar is applied to the gate terminal of the N channel MOS transistor NM1, and a grounding line is connected to the source terminal of the N channel MOS transistor NM1. In this way, the N channel MOS transistor NM1 functions as a switch that fixes or releases, depending on the signal Enb1bar, the output terminal of the error amplifier ErrAMP to or from the grounding line.

The terminal PFC_RT is connected to the source terminal of an N channel MOS transistor NM2 and the inverting input terminal (−) of an operational amplifier Amp1. A reference voltage of 2.8 V is applied to the non-inverting input terminal (+) of the operational amplifier Amp1, and the output terminal of the operational amplifier Amp1 is connected to the gate terminal of the N channel MOS transistor NM2. The drain terminal of the N channel MOS transistor NM2 is connected to the drain terminals of P channel MOS transistors PM1 and PM2. The source terminals of the P channel MOS transistors PM1 and PM2 are connected to a power supply line of 5 V. The signal Enb1 is applied to the gate terminal of the P channel MOS transistor PM1. The gate terminal of the P channel MOS transistor PM2 is connected to the drain terminal thereof and to the gate terminal of a P channel MOS transistor PM3. The source terminal of the P channel MOS transistor PM3 is connected to the power supply line of 5 V. Due to virtual short-circuiting of the operational amplifier Amp1, the N channel MOS transistor NM2 and the operational amplifier Amp1 fix the terminal PFC_RT at 2.8 V and apply the fixed 2.8 V to the resistor R4 connected to the terminal PFC_RT. In this way, a current determined by 2.8 V and the value of the resistor R4 flows through the P channel MOS transistor PM2 that forms a current mirror circuit with the P channel MOS transistor PM3, and a current Iramp obtained by copying the current is outputted from the P channel MOS transistor PM3. When the signal Enb1 is at a high (H) level, the P channel MOS transistor PM1 is set to be off, and the P channel MOS transistors PM2 and PM3 operate as a current mirror circuit and outputs a constant current Iramp. In contrast, when the signal Enb1 is at a low (L) level, the P channel MOS transistor PM1 is set to be on, and the P channel MOS transistor PM3 is set to be off since the voltage of the gate terminal is set to 5 V, which is the voltage of the power supply. As a result, when the current Iramp is not needed, since the current Iramp is not outputted, the power consumption is reduced.

The drain terminal of the P channel MOS transistor PM3 is connected to one terminal of a capacitor C10 and the drain terminal of the N channel MOS transistor NM3. The other terminal of the capacitor C10 is connected to the source terminal of the N channel MOS transistor NM3, one terminal of a capacitor C11, and the output terminal of an operational amplifier Amp2. The other terminal of the capacitor C11 is connected to a grounding line. The output terminal of the operational amplifier Amp2 is connected to the inverting input terminal (−) thereof, to form a voltage follower. The operational amplifier Amp2 outputs a voltage equal to 0.6 V applied to its non-inverting input terminal (+), to fix the voltage across the terminals of the capacitor C11 at 0.6 V. This 0.6 V corresponds to the threshold Vth_comp (see FIG. 3), which is the switching start voltage of the PFC circuit 10. A signal pfc_qb, which will be described below, is applied to the gate terminal of the N channel MOS transistor NM3 connected in parallel with the capacitor C10. When the signal pfc_qb is at an H level, the N channel MOS transistor NM3 is set to be on, and the capacitor C10 is shorted. When the signal pfc_qb is at an L level, the N channel MOS transistor NM3 is set to be off, and the capacitor C10 is charged with a constant current based on the current Iramp. In this way, a ramp signal Ramp that rises from 0.6 V with a certain slope is generated at a connection point of the drain terminal of the P channel MOS transistor PM3 and the capacitor C10.

The ramp signal Ramp is inputted to the non-inverting input terminal (+) of a PWM comparator PWM_Comp, and the current signal pfc_comp outputted by the error amplifier ErrAMP is inputted to the inverting input terminal (−) of the PWM comparator PWM_Comp. The output terminal of the PWM comparator PWM_Comp is connected to one input terminal of an OR circuit OR1.

The ramp signal Ramp is also inputted to the non-inverting input terminal (+) of a comparator Tonmax, and 4.0 V that defines the upper limit of the ramp signal Ramp is applied to the inverting input terminal (−) of the comparator Tonmax. The output terminal of the comparator Tonmax is connected to one input terminal of the OR circuit OR1.

The terminal PFC_CS is supplied with a voltage corresponding to a current flowing through the PFC circuit 10. Since this voltage supplied to the terminal PFC_CS is a negative voltage whose absolute value becomes larger as the current flowing through the PFC circuit 10 becomes larger, the PFC control circuit 33 shifts the negative voltage to a positive voltage. After the level shift, a positive voltage that becomes lower as the current flowing through the PFC circuit 10 becomes larger is obtained. To shift the negative voltage to the positive voltage, the terminal PFC_CS is connected to a line of 0.8 V, which is a reference voltage, via a voltage-dividing circuit formed by resistors R21 to R23 connected in series with each other. A connection point of the resistors R21 and R22 is connected to the inverting input terminal (−) of an overcurrent detection comparator OCP_Comp, and a reference voltage of 115 millivolts (mV) is applied to the non-inverting input terminal (+) of the overcurrent detection comparator OCP_Comp. The output terminal of the overcurrent detection comparator OCP_Comp is connected to one input terminal of the OR circuit OR1.

A connection point of the resistors R22 and R23 is connected to the non-inverting input terminal (+) of a zero current detection comparator ZCD_Comp, and a reference voltage of 20 mV is applied to the inverting input terminal (−) of the zero current detection comparator ZCD_Comp. The output terminal of the zero current detection comparator ZCD_Comp is connected to a restart timer 41 and a ZCD delay circuit 42. The output terminals of the restart timer 41 and the ZCD delay circuit 42 are connected to the input terminals of an OR circuit OR2, and the output terminal of the OR circuit OR2 is connected to the pulse generation circuit 43. The output terminal of the pulse generation circuit 43 is connected to the set terminal of a reset-priority RS flip flop 44, and the reset terminal of the RS flip flop 44 is connected to the output terminal of the OR circuit OR1. The output terminal of the RS flip flop 44 is connected to a terminal PFC_Q that outputs the PFC switching signal pfc_q to the PFC switching detection circuit 34 and is connected to the input terminal of an inverter INV2. The output terminal of the inverter INV2 is connected to the gate terminal of the N channel MOS transistor NM3 and the restart timer 41 and outputs the signal pfc_qb obtained by inverting the signal pfc_q. The output terminal of the RS flip flop 44 is connected to the input terminal of a driver 45, and the output terminal of the driver 45 is connected to the terminal PFC_OUT.

As illustrated in FIG. 5, the restart timer 41 has an AND circuit AND1 to which the signal pfc_qb and the signal Enb1 are inputted, and the output terminal of the AND circuit AND1 is connected to the gate terminal of an N channel MOS transistor NM4. The drain terminal of the N channel MOS transistor NM4 is connected to a constant current circuit 46, and the source terminal of the N channel MOS transistor NM4 is grounded. A connection point of the drain terminal of the N channel MOS transistor NM4 and the constant current circuit 46 is connected to one terminal of a capacitor C12 and the input terminal of an inverter INV3. The other terminal of the capacitor C12 is grounded. The output terminal of the inverter INV3 is connected to the input terminal of an inverter INV4, and the output terminal of the inverter INV4 is connected to an input terminal of the AND circuit AND1 and the input terminal of a one-shot circuit 47. The output terminal of the one-shot circuit 47 is connected to an input terminal of the OR circuit OR2 and the reset terminal of an RS flip flop 48. A zero current detection signal zcd is inputted to the set terminal of the RS flip flop

48, and the output terminal of the RS flip flop 48 is connected to an input terminal of the AND circuit AND1.

Next, an operation of the PFC control circuit 33 in the control IC 30 will be described. First, after the AC power supply is turned on, the starting circuit 31 supplies a starting current to the capacitor Cvcc, and the voltage at the terminal VCC is boosted. Until the voltage at the terminal VCC reaches the threshold Vccon, which is the UVLO cancelation voltage, the signal Enb1 outputted by the UVLO circuit 32 is maintained at an L level.

During this point, the P channel MOS transistor PM1 in the PFC control circuit 33 is on, and the current Iramp is not supplied. Namely, the terminal PFC_COMP is fixed at the GND line by the N channel MOS transistor NM1 so that the voltage at the terminal PFC_COMP will not be boosted. In addition, since the L level signal Enb1 is inputted to the restart timer 41, an L level signal is outputted from the restart timer 41. In addition, since an H level signal Enb1bar is inputted to the OR circuit OR1, the RS flip flop 44 is maintained in a reset state. Thus, since the PFC switching signal pfc_q outputted by the RS flip flop 44 is at an L level, the terminal PFC_OUT is fixed at an L level.

In this state, an H level signal pfc_qb is outputted by the inverter INV2. Thus, the N channel MOS transistor NM3 is set to be on, and both terminals of the timing capacitor C10 of an oscillator are shorted. As a result, the ramp signal Ramp is fixed at 0.6 V.

Since the voltage at the terminal PFC_COMP is fixed at the GND line, the voltage is lower than the ramp signal Ramp, which is 0.6 V, and the PWM comparator PWM_Comp outputs an H level signal. Consequently, the RS flip flop 44 is reset, and an L level signal is outputted from the terminal PFC_OUT. When the signal Enb1bar is inverted, the N channel MOS transistor NM1 is set to off, and the voltage at the terminal PFC_COMP is boosted. However, as long as the value of this voltage is lower than 0.6 V, the PWM comparator PWM_Comp continues to output an H level signal.

When the voltage at the terminal VCC is boosted and exceeds the threshold Vccon, which is the UVLO cancelation voltage, an H level signal Enb1 is inputted from the UVLO circuit 32 to the PFC control circuit 33. As a result, the P channel MOS transistor PM1 is set to off, and the current Iramp starts to be supplied. In addition, the N channel MOS transistor NM1 is set to off, and the terminal PFC_COMP is released from the GND line.

Before the PFC circuit 10 starts a switching operation, the intermediate voltage Vbulk is not boosted yet. Thus, the voltage at the terminal PFC_FB, the voltage being obtained by dividing the intermediate voltage Vbulk, is also low. In this case, the error amplifier ErrAMP outputs a large source current, to charge the phase compensation capacitor Ccomp connected to the terminal PFC_COMP.

In the initial period in which the signal Enb1 is at an L level, since no current flows through the current detection resistor Rs, the zero current detection signal zcd is at an H level. In addition, since the RS flip flop 44 is in a reset state as described above, the signal pfc_qb is at an H level. In this state, since the signal Enb1 is at an L level, the AND circuit AND1 outputs an L level signal. Thus, since the N channel MOS transistor NM4 is set to off, the constant current circuit 46 continues to charge the capacitor C12. Accordingly, the charging voltage of the capacitor C12 immediately reaches the inversion threshold of the inverter INV3, and the inverter INV4 outputs an H level signal.

In this state, when the signal Enb1 is inverted to an H level, the AND circuit AND1 outputs an H level signal. Consequently, the N channel MOS transistor NM4 is set to on, and the charges of the capacitor C12 are released. Accordingly, since the inverter INV4 outputs an L level signal, the AND circuit AND1 outputs an L level signal, again. Thus, the constant current circuit 46 starts to charge the capacitor C12, again.

Subsequently, the following cycle is repeated: "the charging voltage of the capacitor C12 reaches the inversion threshold of the inverter INV3→the charges of the capacitor C12 are released, and charging of the capacitor C12 is resumed". In addition, each time the charging voltage of the capacitor C12 reaches the inversion threshold of the inverter INV3, the one-shot circuit 47 outputs a start pulse.

When receiving a start pulse from the one-shot circuit 47, the pulse generation circuit 43 outputs a pulse for setting the RS flip flop 44. However, this pulse is an invalid signal, as long as a reset signal is inputted to the RS flip flop 44.

As described above, when the voltage at the terminal PFC_COMP reaches 0.6 V or more, the supply of the reset signal to the RS flip flop 44 is stopped. When a one-shot circuit 47 subsequently outputs a start pulse, the RS flip flop 44 is set, and the signal pfc_qb is changed to an L level. As a result, the above cycle is ended, and the following normal cycle is started.

The normal cycle is as follows: "the RS flip flop 44 is set, and the on-operation of the switching element Q and the charging of the capacitor C12 are started→when off conditions of the switching element Q are met, the RS flip flop 44 is reset, and the switching element Q is set to off→when the current flowing through the inductor Lp is decreased and zero current is detected by the zero current detection comparator ZCD_Comp, the charges of the capacitor C12 are released→when a delay time based on the ZCD delay circuit 42 elapses, the RS flip flop 44 is set, and the charging of the capacitor C12 is resumed".

Since the cycle of the charging and discharging of the capacitor C12 is set to be longer than the cycle at which the zero current detection comparator ZCD_Comp detects zero current, normally a start pulse is generated only immediately after the AC power supply is turned on. However, if a state in which the zero current detection comparator ZCD_Comp does not detect zero current continues due to some trouble, the restart timer 41 forcibly sets the switching element Q to be off.

When the zero current detection comparator ZCD_Comp detects zero current, the ZCD delay circuit 42 delays the zero current detection signal zcd by the difference from a phase where the resonance voltage applied to the drain of the switching element Q reaches a minimum level. Next, the delayed signal is supplied to the pulse generation circuit 43. In this way, a pulse for continuing the switching is outputted from the pulse generation circuit 43, and the RS flip flop 44 is set. As a result, an H-level PFC switching signal pfc_q is outputted from the output terminal of the RS flip flop 44. The drive capability of this PFC switching signal pfc_q is increased by the driver 45 and is outputted as the drive signal pfc_out, which is supplied from the terminal PFC_OUT to the gate terminal of the switching element Q. Consequently, the switching element Q is set to be on, and the voltage at the connection point of the inductor Lp and the diode Dp, namely, the drain voltage of the switching element Q, reaches zero. When the switching element Q is set to be on, a current, which is proportional to the voltage applied to the inductor Lp (the voltage obtained by rectifying the AC input voltage) and a time period since the switching element Q has been set to be on, flows through the inductor Lp.

The H-level PFC switching signal pfc_q is inverted by the inverter INV2 to an L-level signal pfc_qb, which is supplied to the gate terminal of the N channel MOS transistor NM3. As a result, since the N channel MOS transistor NM3 is set to be off, a ramp signal Ramp that rises from 0.6 V with a certain slope is generated at the connection point of the drain terminal of the P channel MOS transistor PM3 and the capacitor C10. The PWM comparator PWM_Comp compares this ramp signal Ramp with the current signal pfc_comp outputted by the error amplifier ErrAMP. When the voltage of the ramp signal Ramp exceeds that of the current signal pfc_comp outputted by the error amplifier ErrAMP, the PWM comparator PWM_Comp outputs an H level signal, which is supplied to the reset terminal of the RS flip flop 44 via the OR circuit OR1. As a result, the RS flip flop 44 is reset and outputs an L level PFC switching signal pfc_q. Consequently, the switching element Q is set to be off. In this case, the current flowing through the inductor Lp charges the smoothing capacitor Cbulk, generates the intermediate voltage Vbulk, and decreases with time.

The L-level PFC switching signal pfc_q outputted by the RS flip flop 44 is inverted by the inverter INV2 to an H-level signal pfc_qb, which is supplied to the gate terminal of the N channel MOS transistor NM3. As a result, the N channel MOS transistor NM3 is set to be on, and the capacitor C10 is shorted.

In this way, regarding the PFC circuit 10, since the current signal pfc_comp and the ramp signal Ramp are compared with each other, and a PWM operation is performed, the voltage at the terminal PFC_FB is maintained at 2.5 V. Namely, the intermediate voltage Vbulk is maintained at a target voltage (for example, 400 V). In the PWM operation, when the voltage at the terminal PFC_FB is higher than 2.5 V, the error amplifier ErrAMP outputs a sink current. In this case, as illustrated in FIG. 6A, a voltage V_pfc_comp 1 at the terminal PFC_COMP is maintained low since the charges of the capacitor Ccomp connected to the terminal PFC_COMP are discharged. As a result, the pulse width of the drive signal pfc_out outputted from the terminal PFC_OUT is narrowed, and the intermediate voltage Vbulk is decreased. In contrast, when the voltage at the terminal PFC_FB is lower than 2.5 V, the error amplifier ErrAMP outputs a source current. In this case, as illustrated in FIG. 6B, a voltage V_pfc_comp_2 at the terminal PFC_COMP is maintained high since the capacitor Ccomp connected to the terminal PFC_COMP is charged. As a result, the pulse width of the drive signal pfc_out outputted from the terminal PFC_OUT is widened, and the intermediate voltage Vbulk is increased.

Since the voltage at the terminal PFC_COMP is maintained approximately at the same level in about one cycle of the input voltage, it is possible to consider the on-time of the switching element Q during one cycle of the input voltage to be constant. Thus, the peak value of the input current in an individual switching cycle is proportional to the input voltage (peak current=applied voltage of L1×on-time/L1 (L1 denotes inductance of the inductor Lp)), and the power factor correction is performed.

In addition, in this PFC control circuit 33, when the overcurrent detection comparator OCP_Comp detects an overcurrent and outputs an H-level overcurrent protection signal ocp1, the RS flip flop 44 is reset, and the switching operation is forcibly stopped. In addition, when the comparator Tonmax detects that the voltage of the ramp signal Ramp has exceeded 4.0 V, the RS flip flop 44 is also reset, and the drive signal pfc_out is switched to an L level. As a result, the switching operation is forcibly stopped.

Figure 7A:
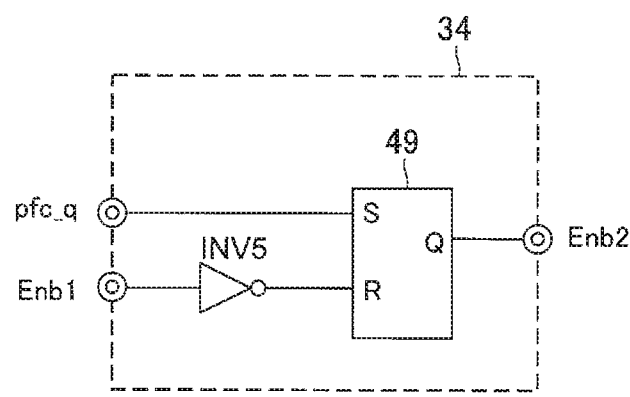
FIGS. 7A and 7B illustrate a PFC switching detection circuit, FIG. 7A being a circuit diagram illustrating a specific configuration example of the PFC switching detection circuit and FIG. 7B illustrating input-output waveforms of the PFC switching detection circuit.
Figure 7B:
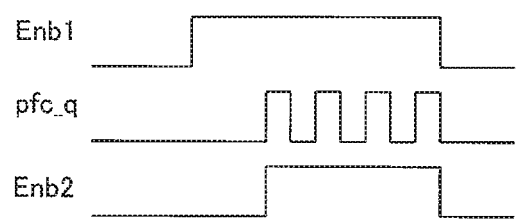

FIGS. 7A and 7B illustrate the PFC switching detection circuit 34, FIG. 7A being a circuit diagram illustrating a specific configuration example of the PFC switching detection circuit 34 and FIG. 7B illustrating input-output waveforms of the PFC switching detection circuit 34.

As illustrated in FIG. 7A, the PFC switching detection circuit 34 includes an inverter INV5 and an RS flip flop 49. The PFC switching detection circuit 34 has a terminal that receives the PFC switching signal pfc_q, and this terminal is connected to the set terminal of the RS flip flop 49. The PFC switching detection circuit 34 also has a terminal that outputs the signal Enb2, and this terminal is connected to the output terminal of the RS flip flop 49. The PFC switching detection circuit 34 also has a terminal that receives the signal Enb1, and this terminal is connected to the input terminal of the inverter INV5, and the output terminal of the inverter INV5 is connected to the reset terminal of the RS flip flop 49.

The PFC switching detection circuit 34 receives the signal Enb1 from the UVLO circuit 32. While the signal Enb1 is maintained at an L level, since the RS flip flop is reset, the PFC switching detection circuit 34 outputs an L level signal Enb2, as illustrated in FIG. 7B.

When the PFC switching detection circuit 34 receives an H-level signal Enb1 for instructing the PFC control circuit 33 to start an operation, the RS flip flop 49 is set to be ready to receive the PFC switching signal pfc_q. When the RS flip flop 49 receives the PFC switching signal pfc_q and when the PFC switching signal pfc_q is switched to an H level for the first time, the output state of the RS flip flop 49 is switched. Namely, the RS flip flop 49 outputs an H-level signal Enb2. Subsequently, the PFC switching detection circuit 34 maintains the signal Enb2 at the H level until the signal Enb1 is switched to the L level, again.

In this way, while receiving the H-level signal Enb1, if the PFC switching detection circuit 34 receives the PFC switching signal pfc_q, which is basically the same signal as the drive signal pfc_out for switching the switching element Q, the PFC switching detection circuit 34 outputs the H-level signal Enb2. This H-level signal Enb2 is supplied as a signal for instructing the LLC control circuit 35 to start an operation.

Figure 8:
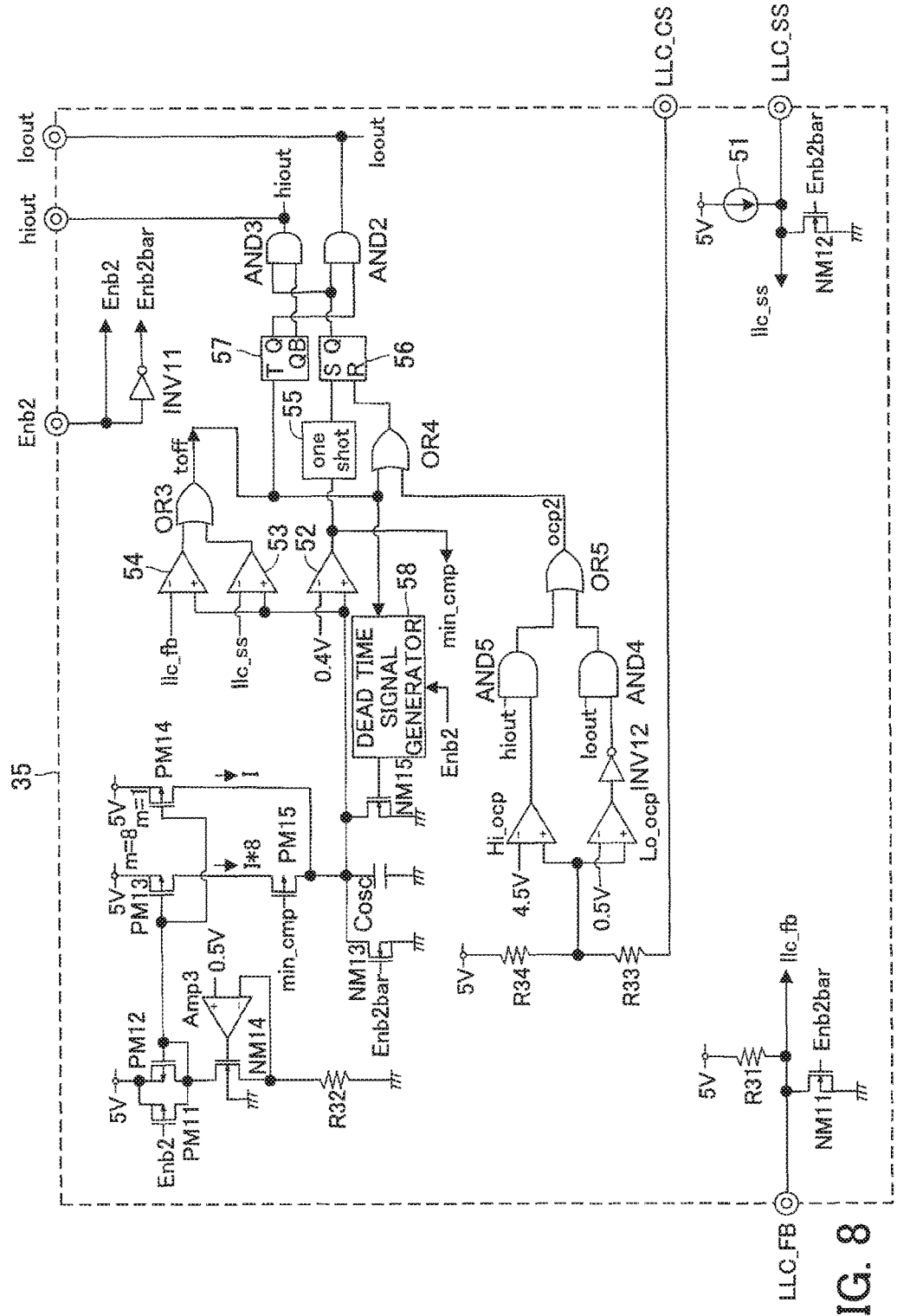
FIG. 8 is a circuit diagram illustrating a specific configuration example of an inductor capacitor (LLC) control circuit.
Figure 9A:
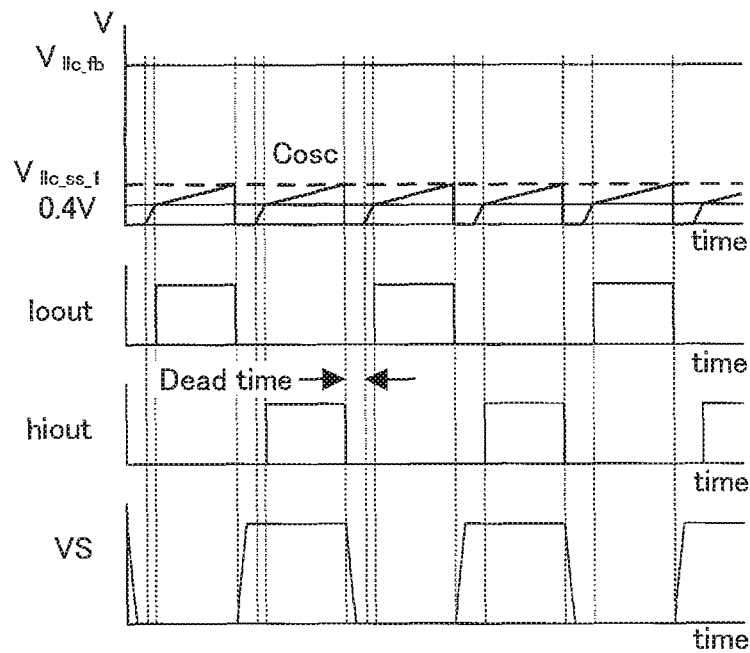
FIGS. 9A and 9B illustrate waveforms of a soft start operation when the LLC control circuit starts a switching operation, FIG. 9A illustrating switching waveforms when a voltage across a soft start capacitor is low and FIG. 9B illustrating switching waveforms when the voltage across the soft start capacitor is high.
Figure 9B:
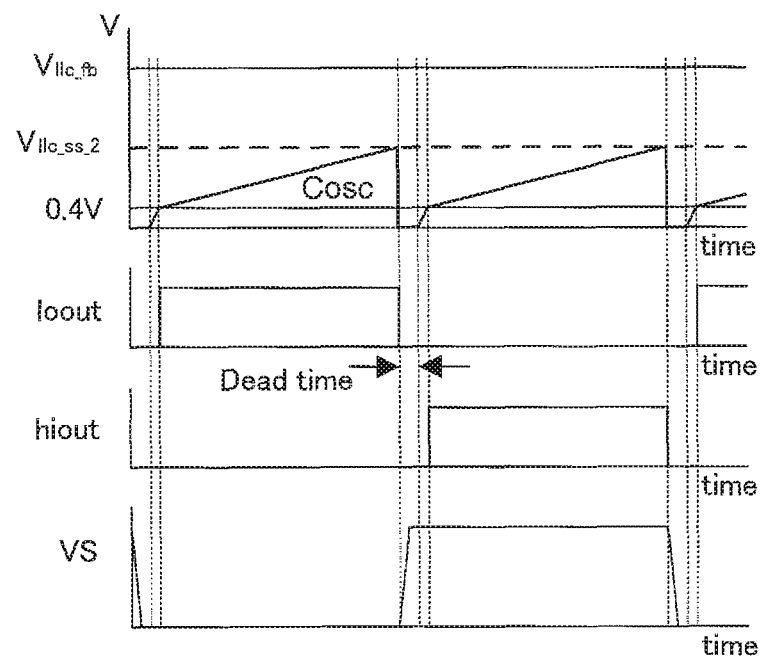

FIG. 8 is a circuit diagram illustrating a specific configuration example of the LLC control circuit 35. FIGS. 9A and 9B illustrate waveforms of a soft start operation when the LLC control circuit 35 starts a switching operation, FIG. 9A illustrating switching waveforms when the voltage across the soft start capacitor is low and FIG. 9B illustrating switching waveforms when the voltage across the soft start capacitor is high.

The LLC control circuit 35 includes a terminal Enb2 that receives the signal Enb2 for instructing the start of an operation from the PFC switching detection circuit 34. This terminal Enb2 is connected to the input terminal of an inverter INV11, and a signal Enb2bar obtained by inverting the signal Enb2 is outputted from the output terminal of the inverter INV11.

The LLC control circuit 35 includes the terminal LLC_FB connected to the collector terminal of the phototransistor of the photocoupler PC1 and the capacitor C5. This terminal LLC_FB is connected to one terminal of a pull-up resistor R31. The other terminal of pull-up resistor R31 is connected to a power supply line of 5 V. The terminal LLC_FB is also connected to the drain terminal of an N channel MOS transistor NM11, and the source terminal of the N channel MOS transistor NM11 is connected to a GND line. The signal Enb2bar obtained by inverting the signal Enb2 is applied to the gate terminal of the N channel MOS transistor NM11. A signal llc_fb is outputted from a connection point of the pull-up resistor R31 and the drain terminal of the N channel MOS transistor NM11.

The LLC control circuit 35 also includes the terminal LLC_SS connected to the soft start capacitor Css, and this terminal LLC_SS is connected to one terminal of a constant current circuit 51. The other terminal of the constant current circuit 51 is connected to a power supply line of 5 V. In addition, the terminal LLC_SS is connected to the drain terminal of an N channel MOS transistor NM12, and the source terminal of the N channel MOS transistor NM12 is connected to a GND line. The signal Enb2bar obtained by inverting the signal Enb2 is applied to the gate terminal of the N channel MOS transistor NM12. A signal llc_ss is outputted from a connection point of the constant current circuit 51 and the drain terminal of the N channel MOS transistor NM12.

The LLC control circuit 35 includes an LLC oscillator timing capacitor Cosc, and one terminal of this timing capacitor Cosc is connected the drain terminal of an N channel MOS transistor NM13. The source terminal of the N channel MOS transistor NM13 and the other terminal of the timing capacitor Cosc are connected to a GND line. The signal Enb2bar obtained by inverting the signal Enb2 is applied to the gate terminal of the N channel MOS transistor NM13.

The one terminal of the timing capacitor Cosc is connected to a charging circuit capable of rapid charging and gradual charging. Specifically, this charging circuit includes channel MOS transistors PM11 and PM12, and the source terminals of these P channel MOS transistors PM11 and PM12 are connected to a power supply line of 5 V. Both the drain terminals of the P channel MOS transistors PM11 and PM12 are connected to each other and to the drain terminal of an N channel MOS transistor NM14. The source terminal of the N channel MOS transistor NM14 is connected to one terminal of a resistor R32, and the other terminal of the resistor R32 is connected to a GND line. The source terminal of the N channel MOS transistor NM14 is also connected to the inverting input terminal (−) of an operational amplifier Amp3. A reference voltage of 0.5 V is applied to the non-inverting input terminal (+) of the operational amplifier Amp3, and the output terminal of the operational amplifier Amp3 is connected to the gate terminal of the N channel MOS transistor NM14. The drain terminal of the P channel MOS transistor PM12 is connected to the gate terminal thereof and the gate terminals of P channel MOS transistors PM13 and PM14. The source terminals of the P channel MOS transistors PM13 and PM14 are connected to a power supply line of 5 V.

The P channel MOS transistors PM12 to PM14 form a current mirror circuit. The input current of the current mirror circuit is obtained by fixing the voltage applied to the resistor R32 by the operational amplifier Amp3 and the N channel MOS transistor NM14 at 0.5 V via virtual short-circuiting of the two input terminals of the operational amplifier Amp3. This input current is copied, and currents proportional to the input current are outputted from the drain terminals of the P channel MOS transistors PM13 and PM14. In this embodiment, the mirror ratio is set so that, when the current outputted from the P channel MOS transistor PM14 is a current I, the current outputted from the P channel MOS transistor PM13 is current I*8.

The drain terminal of the P channel MOS transistor PM13 is connected to the source terminal of a P channel MOS transistor PM15. The drain terminal of the P channel MOS transistor PM15 is connected to the drain terminal of the P channel MOS transistor PM14 and the above one terminal of the timing capacitor Cosc. An L-level signal min_cmp, which will be described below, is applied to the gate terminal of the P channel MOS transistor PM15. When the P channel MOS transistor PM15 is on, a current I*(1+8) is supplied to the timing capacitor Cosc. When an H-level signal min_cmp is applied to the gate terminal and when the P channel MOS transistor PM15 is off, the current I is supplied to the timing capacitor Cosc.

Since the above charging circuit is capable of supplying two kinds of current, the charging circuit forms, with the timing capacitor Cosc, a ramp voltage generation circuit that generates a ramp voltage having two slopes.

In addition, the signal Enb2 is applied to the gate terminal of the P channel MOS transistor PM11 connected in parallel to the P channel MOS transistor PM12. When an L-level signal Enb2 is applied to the gate and when the P channel MOS transistor PM11 is set to be on, the gate terminals of the P channel MOS transistors PM12 to PM14 are connected to the power supply line of 5 V, and as a result, the P channel MOS transistors PM12 to PM14 are set to be off. Namely, the charging circuit stops supplying the charging current to the timing capacitor Cosc.

The above one terminal of the timing capacitor Cosc is also connected to the non-inverting input terminals (+) of comparators 52 to 54. The signal llc_ss is applied to the inverting input terminal (−) of the comparator 53, and the signal llc_fb is applied to the inverting input terminal (−) of the comparator 54. A reference voltage of 0.4 V is applied to the inverting input terminal (−) of the comparator 52, and the output terminal of a comparator 52 is connected to the input terminal of a one-shot circuit 55 and to the gate terminal of the P channel MOS transistor PM15. The output terminal of the one-shot circuit 55 is connected to the set terminal of an RS flip flop 56, and the output terminal of the RS flip flop 56 is connected to one input terminal of an AND circuit AND2 and to one input terminal of an AND circuit AND3. The output terminals of the comparators 53 and 54 are connected to the input terminals of the OR circuit OR3, and the output terminal of the OR circuit OR3 is connected to one input terminal of an OR circuit OR4 and to the trigger terminal T of a toggle flip flop 57. The output terminal of the OR circuit OR4 is connected to the reset terminal of the RS flip flop 56. The output terminal of the toggle flip flop 57 is connected to the other input terminal of the AND circuit AND2, and the inverting output terminal of the toggle flip flop 57 is connected to the other input terminal of the AND circuit AND3. The output terminal of the AND circuit AND2 is connected to a terminal that outputs low-side drive signal loout, and the output terminal of the AND circuit AND3 is connected to a terminal that outputs the high-side drive signal hiout.

The output terminal of the OR circuit OR3 is also connected to an input terminal of a dead time signal generator 58, and the output terminal of the dead time signal generator 58 is connected to the gate terminal of an N channel MOS transistor NM15. The drain terminal of the N channel MOS transistor NM15 is connected to the above one terminal of the timing capacitor Cosc, and the source terminal of the N channel MOS transistor NM15 is connected to a GND line. The signal Enb2 allowing a generation operation of a dead time signal is also inputted to the dead time signal generator 58.

The LLC control circuit 35 includes the terminal LLC_CS receiving a current detection signal, which is a voltage obtained by converting a current proportional to a resonance current. This terminal LLC_CS is connected to one terminal of a resistor R33, and the other terminal of the resistor R33 is connected to one terminal of a resistor R34. The other terminal of the resistor R34 is connected to a power supply line of 5 V. These resistors R33 and R34 are arranged to shift the current detection signal, which changes positively and negatively from 0 V, to 0 V or more.

A connection point of the resistors R33 and R34 is connected to the non-inverting input terminals (+) of a low-side overcurrent detection comparator Lo_ocp and a high-side overcurrent detection comparator Hi_ocp. A reference voltage of 0.5 V is applied to the inverting input terminal (−) of the comparator Lo_ocp, and a reference voltage of 4.5 V is applied to the inverting input terminal (−) of the comparator Hi_ocp. The output terminal of the comparator Lo_ocp is connected to an input terminal of an inverter INV12, and the output terminal of the inverter INV12 is connected to one input terminal of an AND circuit AND4. The output terminal of the comparator Hi_ocp is connected to one input terminal of an AND circuit AND5. The low-side drive signal loout is inputted to the other input terminal of the AND circuit AND4, and the high-side drive signal hiout is inputted to the other input terminal of the AND circuit AND5. The output terminals of the AND circuits AND4 and AND5 are connected to the input terminals of an OR circuit OR5, and the output terminal of the OR circuit OR5 is connected to the other input terminal of the OR circuit OR4. In FIG. 8, the comparators Hi_ocp and Lo_ocp, the inverter INV12, the AND circuits AND4 and AND5, and the OR circuit OR5 form an overcurrent protection circuit.

In the LLC control circuit 35 having the above configuration, first, before the PFC control circuit 33 starts the switching of the switching element Q, the signal Enb2 is maintained at an L level, and the inverted signal Enb2bar is maintained at an H level. In this state, since the terminal LLC_SS, the terminal LLC_FB, and the LLC oscillator timing capacitor Cosc are fixed to a GND line by the N channel MOS transistors NM11 to NM13, switching is not performed.

When the PFC switching detection circuit 34 detects the start of the switching of the switching element Q, the signal Enb2 outputted by the PFC switching detection circuit 34 is switched to an H level. Consequently, the N channel MOS transistors NM11 to NM13, which have been fixing the terminal LLC_SS, the terminal LLC_FB, and the LLC oscillator timing capacitor Cosc to the GND line, are set to be off. As a result, the soft start capacitor Css connected to the terminal LLC_SS and the capacitor C5 and the LLC oscillator timing capacitor Cosc connected to the terminal LLC_FB start to be charged.

However, at this point, since the timing capacitor Cosc is fixed to the GND line by the N channel MOS transistor NM15, the charging of the timing capacitor Cosc is not started.

Since the signal Enb2 is switched to an H level, the dead time signal generator 58 starts to operate, and the N channel MOS transistor NM15, which has been fixing the timing capacitor Cosc to the GND line, is set to be off after a certain dead time elapses. At this point, since the P channel MOS transistor PM11 has already been off and the P channel MOS transistor PM15, which has been receiving an L-level signal min_cmp from the comparator 52, has been on, the timing capacitor Cosc starts to be charged rapidly.

When the voltage across the timing capacitor Cosc reaches 0.4 V, the output state of the comparator 52 switches to an H level. As a result, since the P channel MOS transistor PM15 is set to be off, when the voltage across the timing capacitor Cosc reaches 0.4 V, the charging of the timing capacitor Cosc is switched to gradual charging, as illustrated in FIGS. 9A and 9B.

At this point, a turn-on signal is generated by the one-shot circuit 55, the RS flip flop 56 is set, and an H-level signal is inputted to one input terminal of each of the AND circuits AND2 and AND3. Namely, the reference voltage of 0.4 V applied to the inverting input terminal (−) of the comparator 52 corresponds to a threshold Vth_sson (see FIG. 3), which is the switching start voltage of the LLC current resonance type DC-DC converter 20. In contrast, a turn-off signal toff is generated by the comparators 53 and 54 and the OR circuit OR3. Namely, when the voltage across the timing capacitor Cosc reaches the lower one of the voltages of the signal llc_fb and signal llc_ss from 0.4 V, a turn-off signal toff is generated. This turn-off signal toff is inputted to the reset terminal of the RS flip flop 56 via the OR circuit OR4. Thus, the on-width of the low-side driving signal loout or the high-side drive signal hiout outputted from the AND circuit AND2 or the AND circuit AND3 is between when the turn-on signal is generated and when the turn-off signal toff is generated. Thus, as illustrated in FIG. 9A, when a voltage Vllc_ss_1 across the soft start capacitor Css is low, the on-width of the low-side driving signal loout or the high-side drive signal hiout is narrowed, and the switching frequency is increased. In contrast, as illustrated in FIG. 9B, when a voltage Vllc_ss_2 across the soft start capacitor Css is high, the on-width of the low-side driving signal loout or the high-side drive signal hiout is widened, and the switching frequency is decreased.

While FIGS. 9A and 9B illustrate a soft start operation when signal llc_ss<signal llc_fb, a relationship between the signal llc_fb and the switching frequency in a normal operation when signal llc_ss>signal llc_fb is the same as that illustrated in FIGS. 9A and 9B. Namely, the larger the signal llc_fb is, the lower the switching frequency will be. In the case of the LLC current resonance type DC-DC converter 20, the lower the switching frequency is, the higher the ratio of output voltage/input voltage will be.

In addition, the turn-off signal toff is inputted to the trigger terminal T of the toggle flip flop 57. Each time the turn-off signal toff is inputted to the toggle flip flop 57, the output signal and the inverted output signal are inverted alternately. By inputting the output signal and the inverted output signal of the toggle flip flop 57 to the other input terminals of the AND circuits AND2 and AND3, the low-side driving signal loout and the high-side drive signal hiout are generated alternately. The low-side driving signal loout is supplied to the low-side driving circuit 37, and the low-side driving circuit 37 generates a signal whose drive capability has been increased by a driver. This generated signal is supplied to the gate terminal of the switching element Q2 via the terminal LO. The high-side drive signal hiout is supplied to the high-side driving circuit 36. After the high-side drive signal hiout passes through a level shifter, the high-side driving circuit 36 generates a signal whose drive capability has been increased by a driver. This generated signal is supplied to the gate terminal of the switching element Q1 via the terminal HO.

The pull-up current based on the pull-up resistor R31 that charges the capacitor C5 connected to the terminal LLC_FB is set to be larger than the current flowing through the constant current circuit 51 that charges the soft start capacitor Css via the terminal LLC_SS. Thus, since the voltage Vllc_fb at the terminal LLC_FB increases faster than the voltage Vllc_ss at the terminal LLC_SS, the switching frequency is controlled with the voltage at the terminal LLC_SS immediately after the operation of the LLC current resonance type DC-DC converter 20 is started.

The voltage at the terminal LLC_SS is gradually increased, as the constant current circuit 51 charges the soft start capacitor Css with the constant current. As a result, the on-width of the low-side driving signal loout and the high-side drive signal hiout is widened, and a soft start operation in which the oscillation frequency is gradually decreased from the maximum frequency.

Even after an H-level signal Enb2 is inputted, the switching operation is not performed until the voltage at the terminal LLC_SS reaches 0.4 V. Thus, by adjusting the capacitance of the externally connected soft start capacitor Css, it is possible to adjust the time from the detection of the PFC switching to the start of the switching of the DC-DC converter 20.

The terminal LLC_CS for overcurrent detection receives a signal obtained by allowing the shunt capacitor Crd to divide a current flowing through the resonance capacitor Cr, allowing the resistor Rcs to convert the obtained current into the voltage Vcs, and allowing the voltage Vcs to pass through the filter formed by the resistor R8 and the capacitor C3.

Regarding the terminal LLC_CS, the current detection signal changes to positive and negative voltages when the high and low sides are on with respect to the GND line as a reference, respectively. Since a negative voltage is not handled in the control IC 30, the voltage at the terminal LLC_CS is divided by the resistors R33 and R34 from 5 V and is shifted from the level that uses 0 V as a reference to a level that uses 2.5 V as a reference. The comparator Hi_ocp and Lo_ocp compare this shifted voltage with the respective reference voltages. In the example in FIG. 8, 4.5 V and 0.5 V are used as the reference voltages of the comparators Hi_ocp and Lo_ocp, and these voltages are 4V and −4V when converted to the voltages at the terminal LLC_CS.

When the comparator Hi_ocp detects a voltage that matches an overcurrent, the signal outputted from the AND circuit AND5 is supplied to the reset terminal of the RS flip flop 56 via the OR circuits OR5 and OR4 while the high-side drive signal hiout is on. When the RS flip flop 56 is reset, the high-side drive signal hiout is forcibly set to be off. When the comparator Lo_ocp detects a voltage that matches an overcurrent, the signal outputted from the AND circuit AND4 is supplied to the reset terminal of the RS flip flop 56 via the OR circuits OR5 and OR4 while the low-side driving signal loout is on. When the RS flip flop 56 is reset, the low-side driving signal loout is forcibly set to be off.

The above embodiment has been described by using, as an example, a combination of the PFC circuit 10 in a critical current mode and the DC-DC converter 20, which is an LLC current resonance converter. However, the above embodiment is only an example, various modifications could be made without departing from the spirit of the embodiment. For example, the PFC circuit may operate in a different mode other than the critical current mode. For example, a PFC circuit that operates in a different mode such as a continuous current mode or a discontinuous current mode may be used. In addition, the kind of DC-DC converter is not limited to the LLC current resonance converter. For example, a flyback PWM converter, a quasi-resonance converter (QR), a forward converter, or the like may be used.

Since the switching power supply device having the above configuration starts to operate the DC-DC converter after detecting that the PFC circuit has started a switching operation, the operations of the PFC circuit and the DC-DC converter are started in the right order. Immediately after the PFC circuit starts a switching operation, within the shortest time, the DC-DC converter starts to operate. In addition, since this is before both the PFC circuit and the DC-DC converter are completely started, only a capacitor is needed for the power supply for the control IC. Thus, there is no need to install an auxiliary winding for an inductor and supplement the starting power. In addition, since no power is supplied from an auxiliary winding installed for an inductor, an accurate output voltage is estimated on the primary side of a transformer. Namely, an overvoltage detection circuit is installable on the primary side of the transformer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply device comprising:
   a power factor correction circuit configured to receive an alternating current (AC) from an AC power supply and to generate a direct-current (DC) intermediate voltage from the alternating-current (AC);
   a DC-DC converter configured to generate a DC voltage of a predetermined value from the intermediate voltage; and
   a control integrated circuit (IC) configured to control the power factor correction circuit and the DC-DC converter,
   wherein the control IC includes:
      a starting circuit that outputs a current having a voltage that has been adjusted from a pulsating current obtained by rectifying the AC power supply and charges a capacitor used for a power supply of the control IC;
      an under-voltage lockout circuit that monitors a voltage across the capacitor and outputs a first enable signal for instructing the power factor correction circuit to start an operation when the voltage across the capacitor reaches an under-voltage lockout cancelation voltage;
      a first control circuit that starts switching control of the power factor correction circuit upon receiving the first enable signal;
      a switching operation detection circuit that outputs a second enable signal for instructing the DC-DC converter to start an operation upon detecting the switching operation of the power factor correction circuit; and
      a second control circuit that starts to control switching of the DC-DC converter upon receiving the second enable signal.

2. The switching power supply device according to claim 1, wherein the power factor correction circuit includes an inductor and a switching element and is a booster circuit that operates in a critical current mode in which the booster circuit sets the switching element to be on based on a current that flows through the inductor reaching zero.

3. The switching power supply device according to claim 2,
wherein the first control circuit includes:
a zero current detection comparator that monitors the current flowing through the inductor and outputs a signal for turning on the switching element upon detecting that the current flowing through the inductor reaches zero;
an error amplifier that amplifies a difference between a voltage proportional to the intermediate voltage and a first reference voltage; and
a pulse width modulation comparator that compares an output voltage from the error amplifier with a ramp voltage generated by charging a timing capacitor of an oscillator for the power factor correction circuit with a constant current and that outputs a signal for turning off the switching element upon detecting that the ramp voltage exceeds the output voltage from the error amplifier.

4. The switching power supply device according to claim 3,
wherein the first control circuit further includes:
a current detection resistor that converts the current flowing through the inductor into a voltage;
a level shifter that shifts a level of a signal detected by the current detection resistor and supplies the signal to the zero current detection comparator; and
a delay circuit that delays a zero current detection signal detected by the zero current detection comparator.

5. The switching power supply device according to claim 3, wherein the first control circuit starts switching of the switching element upon detecting that the output voltage from the error amplifier exceeds a first threshold voltage.

6. The switching power supply device according to claim 1,
wherein the DC-DC converter is an LLC current resonance converter that includes:
a high-side switching element and a low-side switching element that form a half-bridge circuit and perform switching of the intermediate voltage;
a current resonance circuit that is connected in parallel to the high-side switching element or the low-side switching element;
a transformer whose primary winding is a part of the current resonance circuit; and
an output circuit that rectifies and smoothes a voltage induced across a secondary winding of the transformer and outputs the DC voltage of the predetermined value.

7. The switching power supply device according to claim 6,
wherein the second control circuit includes:
a ramp voltage generation circuit that generates a ramp voltage by charging a timing capacitor of an oscillator for the DC-DC converter with a constant current;
a first comparator that outputs a signal for turning on the high-side switching element or the low-side switching element upon detecting that the ramp voltage exceeds a predetermined voltage;
a second comparator that compares a feedback voltage based on a difference between a voltage obtained by dividing the DC voltage outputted from the output circuit and a second reference voltage with the ramp voltage and outputs a signal for turning off the high-side switching element or the low-side switching element that is set to be on upon detecting that the ramp voltage exceeds the feedback voltage;
a reset-set (RS) flip flop that is set upon receiving the turn-on signal and is reset upon receiving the turn-off signal; and
a toggle flip flop that transmits, upon receiving an output signal from the first comparator, an output signal from the RS flip flop to a high-side driving output signal that drives the high-side switching element or to a low-side driving output signal that drives the low-side switching element.

8. The switching power supply device according to claim 1,
wherein the DC-DC converter further includes a soft start capacitor, and
wherein the second control circuit further includes a constant current circuit that charges the soft start capacitor upon receiving the second enable signal and starts switching of a switching element in the DC-DC converter upon detecting that a voltage across the soft start capacitor exceeds a second threshold voltage.

9. The switching power supply device according to claim 7,
wherein the DC-DC converter further includes a current detection circuit that converts a current proportional to a resonance current flowing through the current resonance circuit into a voltage and outputs the voltage, and
wherein the second control circuit further includes a level shifter that shifts a level of a signal detected by the current detection circuit, a third comparator and a fourth comparator that compare the signal whose level has been shifted with a high-side threshold and a low-side threshold, respectively, and an overcurrent protection circuit that outputs a signal for resetting the RS flip flop when the third or fourth comparator has detected an overcurrent.

* * * * *